Aug. 30, 1949.  A. JOHNSON  2,480,583
MACHINE FOR COOLING CREAM
Filed March 4, 1946  3 Sheets-Sheet 1

INVENTOR.
ALEXANDER JOHNSON
BY
John E. Taylor
ATTORNEY

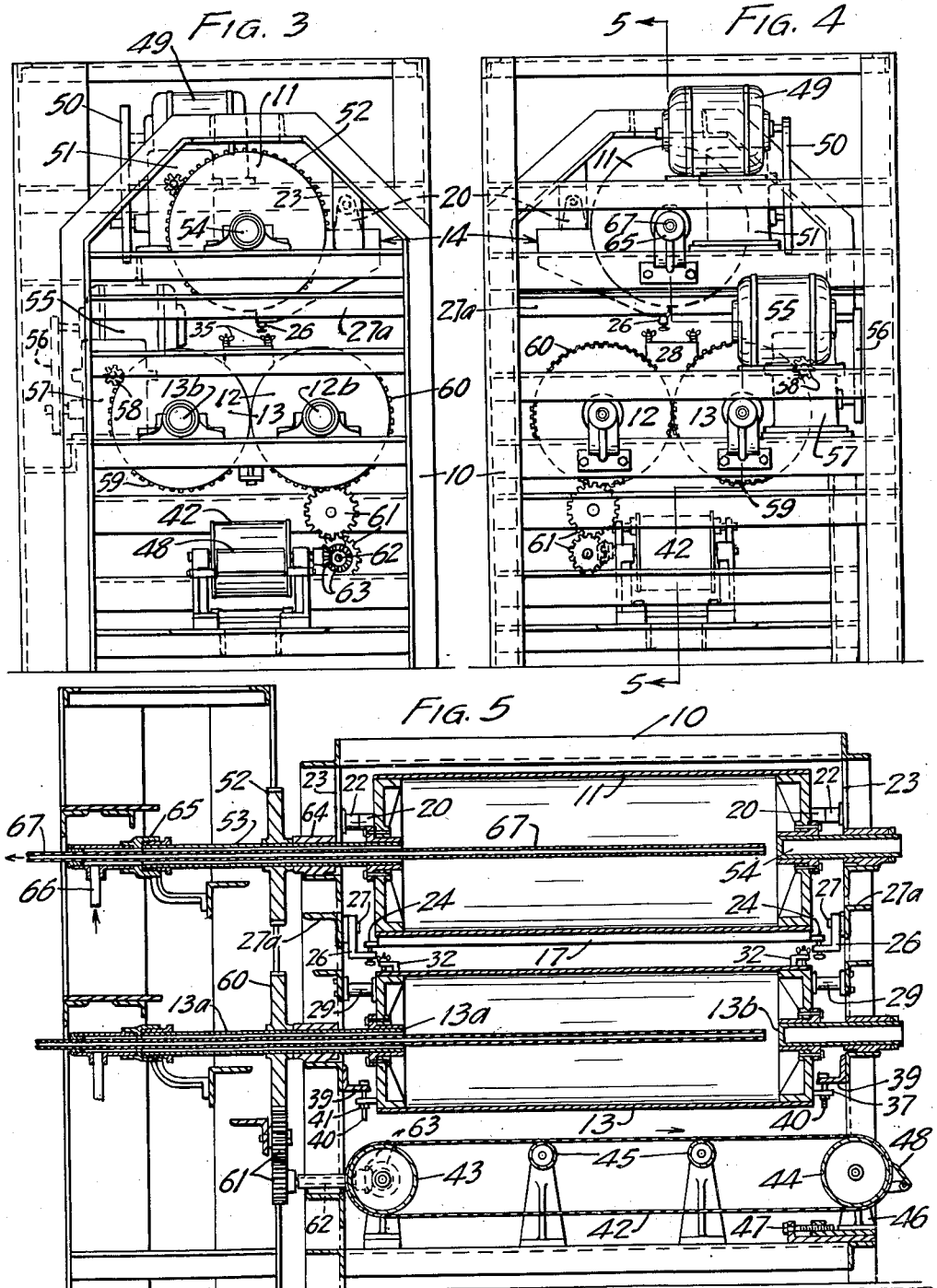

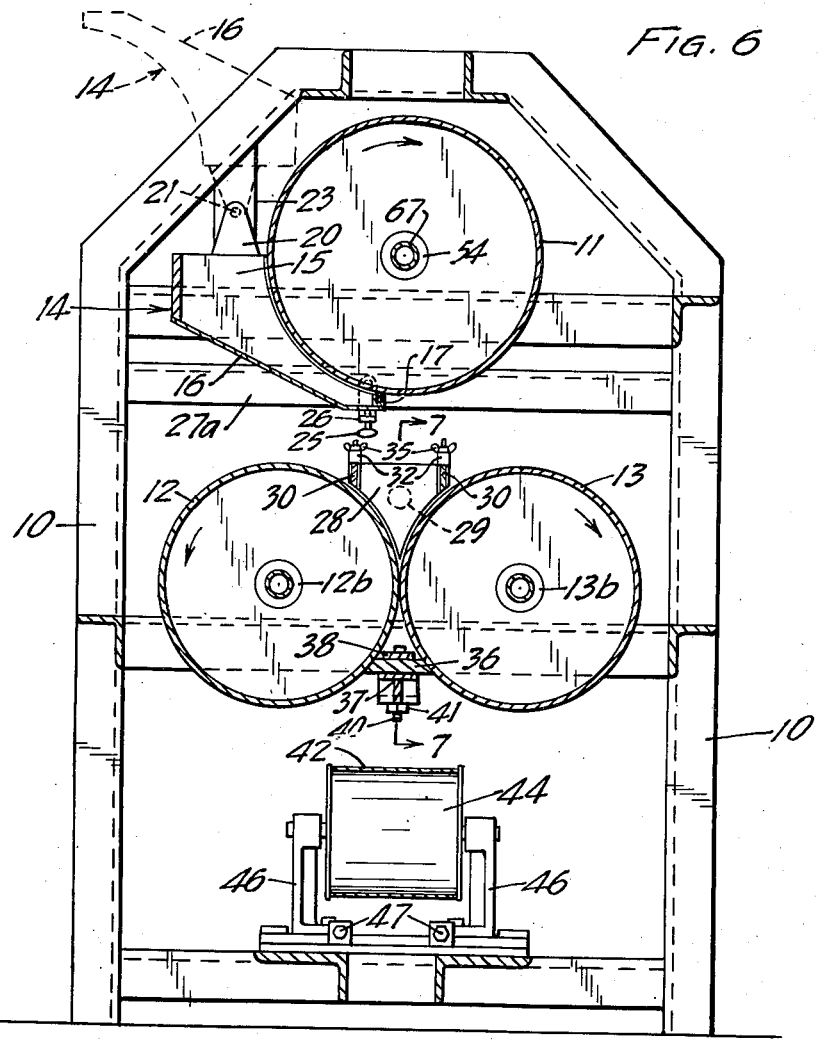
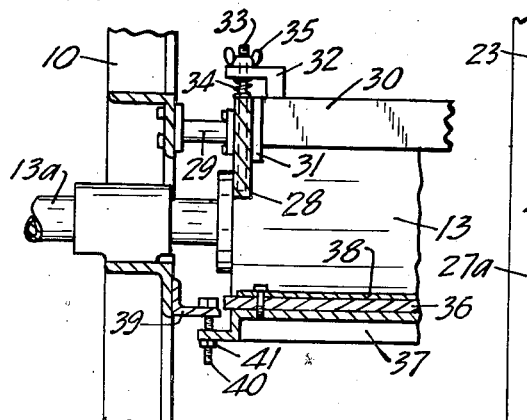
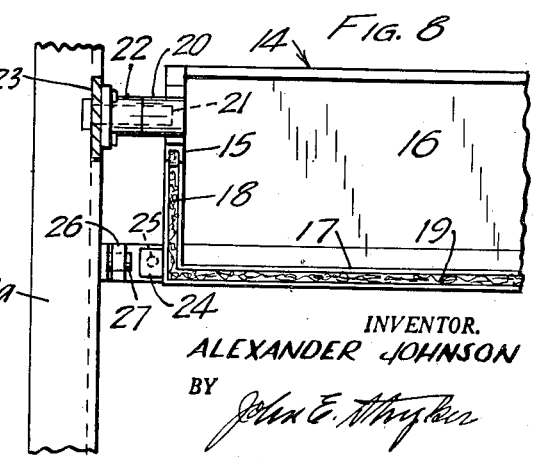

Patented Aug. 30, 1949

2,480,583

UNITED STATES PATENT OFFICE 2,480,583

MACHINE FOR COOLING CREAM

Alexander Johnson, Minneapolis, Minn., assignor to Land O' Lakes Creameries, Inc., Minneapolis, Minn., a corporation of Minnesota Application March 4, 1946, Serial No. 651,841

3 Claims. (Cl. 62—114)

This invention relates to a machine which is particularly adapted for use in cooling and/or congealing cream having a high butterfat content, although it may be used for cooling, thickening or freezing other liquids of various degrees of viscosity. The present machine is an improvement on that described and claimed in my Patent No. 2,131,439, granted September 27, 1938.

It is an object of my invention to provide a novel and efficient machine of this class in which the liquid to be cooled is spread on the outer surfaces of revolving cylinders and the product is forcibly removed from the cylinders after the heat exchange treatment.

A further object is to provide a machine of this class having all surfaces which come in contact with the cream or other product readily accessible for cleaning and sterilization.

A particular object is to provide in a cream cooler of the character described, improved means for spreading the cream on and removing it from a horizontally extending heat exchange cylinder comprising an open trough extending along and in contact with the periphery of the cylinder, the trough having a longitudinally extending wall which is adapted to remove the cooled cream from the cylinder.

Another object is to provide a machine of the character described with improved means for collecting the congealed product from the heat exchange cylinders and discharging it from the machine comprising a flexible, stainless metal belt adapted to be operated continuously and extending longitudinally beneath the heat exchange cylinders.

Other objects will appear and be more fully pointed out in the following specification and claims.

In the accompanying drawings, a preferred form of my invention is illustrated by way of example and not for the purpose of limitation.

Referring to the drawings:

Fig. 3 is an end view of the machine as seen from the right of Figs. 1 and 2;

Fig. 4 is a left end view of the machine;

Fig. 5 is a vertical longitudinal section taken approximately on the line 5—5 of Fig. 4;

Fig. 6 is a vertical cross section taken on the line 6—6 of Fig. 1;

Fig. 7 is a fragmentary vertical section taken approximately on the line 7—7 of Fig. 6, and Fig. 8 is a fragmentary plan view of the feed trough and supports therefor at one end.

Figure 1:
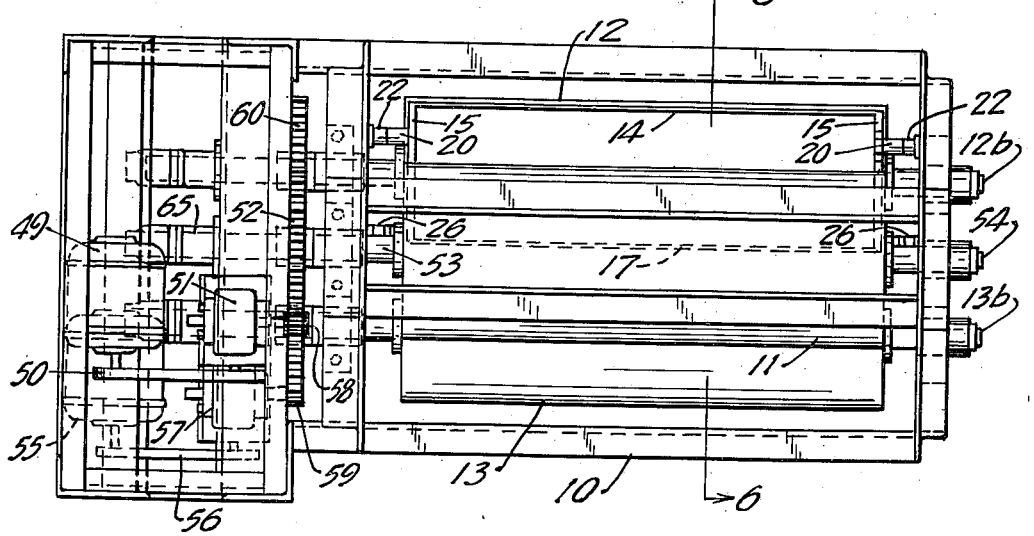
Figure 1 is a plan view of my improved machine.

My machine has a suitable supporting frame indicated generally by the numeral 10. Revolubly mounted on this frame are heat exchange cylinders 11, 12 and 13, the interior of which are supplied with a cooling or refrigerant medium and upon the exterior of which the cream or other liquid to be cooled is spread. The cylinder 11 is disposed above and with its axis extending horizontally and in parallel relation to the axes of the cylinders 12 and 13. The latter are mounted with their peripheries in contact one with the other along a horizontal line between them. The line of contact between the cylinders 12 and 13 extends below the axis of the cylinder 11. Stainless steel is preferably used in the construction of the cylinder peripheries and they have smooth, polished outer surfaces.

A feed trough indicated generally by the numeral 14 extends along one side and below the cylinder 11. This trough has end walls 15 disposed peripendicularly to the axis of the cylinder 11, an inclined bottom 16 and a longitudinal side wall 17 formed by a bar extending parallel to the axis of the cylinder 11. The edges of the end walls 15 and side wall 17 adjacent to the cylinder 11 are provided with sealing strips 18 and 19 respectively which make contact with the cylinder and are preferably constructed from a suitable resilient and compressible material, e. g., cork. When the machine is in operation these sealing strips are pressed against the surface of the cylinder 11 to form a liquid-tight seal and to adapt the trough 14 to contain the cream or other liquid to be tempered. This trough is open at its top and the liquid is fed into it at a rate such as to maintain a pool of substantial depth in contact with the cylinder 11.

The trough 14 is so supported that it may be readily separated from the cylinder 11 for cleaning purposes. A rigid bracket 20 projects upward from each of the end walls 15 and a pivot pin 21 has a bearing in the bracket 20 and is supported in a fixed bearing 22 projecting from a frame member 23. As best shown in Figs. 5, 6 and 8, near the lower extremity of each of the walls 15 a stud 24 projects outward to rest on a set screw 25 threaded in a hanger 26. This hanger is suspended from and is free to oscillate on a stud 27 rigidly mounted on a frame member 27a. It will be evident that by turning the set screws 25 upward, the lower edge of the trough may be pressed upward against the cylinder 11. To free the trough from the cylinder, the screws 25 may be turned downward and then swung with their supporting hangers 26 about the axes of the studs 27. This allows the lower portion of the trough to swing downward and outward about the supporting pins 21. When the trough is to be cleaned and/or sterilized, it may be swung outward and upward to a position such as that indicated in broken lines in Fig. 6.

In operation the cylinder 11 is rotated in the direction indicated by an arrow in Fig. 6 and the wall 17 carrying the sealing strip 19, when in the full line, operative position shown in the drawings, acts as a scraper to remove the coating of liquid from the cylinder 11. From the bar 17 the cooled product falls into a trough, the bottom of which is formed by the cylinders 12 and 13. As best shown in Figs. 6 and 7, this trough has end walls 28 which are rigidly supported on brackets 29 projecting from the frame of the machine near opposite ends respectively of the cylinders. Side walls of the lower trough are formed by bars 30 which are adjustable vertically so that their lower edges are adapted to spread coatings of liquid on the peripheries of the cylinders 12 and 13, as the latter are rotated in the directions indicated by arrows in Fig. 6. Each of the bars 30 is supported at its ends between vertical guide members 31 (Fig. 7) and lugs 32 project upward and laterally from the bars to support them on guide studs 33 and coiled springs 34. Nuts 35 are threaded on the upper ends of the studs 32 to engage and hold them down against the upward thrust of the springs 34. By this arrangement, the springs 34 tend to hold the bars 30 in spaced relation to the peripheries of the cylinders 12 and 13 and the nuts 35 may be manipulated to adjust the spacing and to apply a uniform film or coat of liquid of the desired thickness to the cylinders 12 and 13.

Mounted near and below the bight of the cylinders 12 and 13 is a scraper 36 opposite longitudinal edges of which are held in firm contact with the respective cylinders. The mounting for this scraper comprises a longitudinally extending, rigid bar 37 of T-shape in cross section, an overlying plate 38 and rigid brackets 39 secured to the end frames of the machine. Opposite ends of the bar 37 are secured by the bolts 40 to the respective brackets 39 and nuts 41 are threaded on the bolts 40 to engage the bottom of the bar 37. The scraper 36 is preferably constructed from wood or other material which will not mar the cylinder surfaces or in anywise contaminate the cream or other product with which it comes in contact. The nuts 41 on the bolts 40 afford a ready adjustment for the pressure exerted by the edges of the scrapers 36 on the surfaces of the cylinders 12 and 13.

From the opposite edges of the bar 36 the congealed cream or other product falls on an endless conveyor belt 42 which extends longitudinally of the several cylinders. This belt is preferably constructed from stainless steel and is held under tension in suitable manner. It is trained on a power driven drum 43 and on an idler drum 44 and its upper reach is supported at suitable intervals on rollers 45. Bearing brackets 46 support the idler drum 44 and are adjustable by means of bolts 47 (Figs. 5 and 6) to adjust the tension of the belt 42. Engaging the outer surface of the belt 42 at an end of the machine is a scraper 48 which removes the treated product from the belt and causes it to fall into a suitable receptacle, not shown.

An electric motor 49 (Figs. 1–4) is provided to rotate the cylinder 11 about its axis at a rate which can be regulated independently of the rate of operation of the other cylinders. The driving connections between the motor 49 and cylinder 11 include a belt 50 trained on suitable pulleys, speed reducing gearing in a casing 51 and a gear 52 fixed on a hollow, axially disposed shaft 53 which revolubly supports and drives the cylinder 11. At its opposite end the cylinder 11 is supported on an axially disposed shaft 54 having a suitable journal bearing on the frame of the machine. A motor 55 is arranged to drive the cylinders 12 and 13 through the power transmission mechanism shown and including a belt 56, speed reducing gearing in a casing 57, a pinion 58 and gears 59 and 60 mounted respectively on shafts 13a and 12a supporting the cylinders 13 and 12 at one end. Axially disposed shafts 12b and 13b support the opposite ends of the cylinders 12 and 13 (Figs. 3, 5 and 6). Power for operating the belt 42 is transmitted through a train of gears indicated generally by the numeral 61 and including a shaft 62 and bevel gearing 63 connected to the drum 43.

A cooling fluid or refrigerant is circulated through the cylinder 11 by a suitable arrangement of inlet and outlet conduits. As best shown in Fig. 5, a hollow shaft 53 is supported in longitudinally spaced bearings 64 and 65 and a pipe 66 communicates with the outer end of this shaft which is open at its inner end within the cylinder 11. Extending longitudinally within the shaft 53 and cylinder is a stationary pipe 67 supported in the bearing 65. Cooling fluid may be admitted under pressure through the pipe 66 so that it passes within the shaft 53 to the interior of the cylinder 11 and after cooling the cylinder is discharged through the pipe 67. Obviously the direction of flow may be reversed by admitting the fluid under pressure through the pipe 67 and drawing it off through the shaft 53 and pipe 66. By a similar arrangement of fittings, bearings and piping, the interior of the cylinders 12 and 13 may be supplied with refrigerant. In the interest of economy, I prefer to supply cold water to the cylinder 11 and low temperature brine or other refrigerant as a cooling medium at a lower temperature to the cylinders 12 and 13.

*Operation*

In operation, the cylinders 11, 12 and 13 are continuously rotated in the direction indicated by arrows in Fig. 6 and each of these cylinders is maintained at a predetermined temperature by circulating a cooling medium through it. The belt 42 is continuously operated, as indicated, to collect the congealed or refrigerated product and to deliver it over the scraper blade 48 into a storage or shipping receptacle. Where the machine is used to cool and congeal cream, the warm cream, immediately after pasteurization and approximately at the pasteurizing temperature of approximately 140 degrees F. may be fed into the trough 14. In some cases it is desirable to feed the cream to this trough directly from one or more separators. My machine is particularly adapted for congealing cream which contains a high percentage of butterfat, e. g., 40%. Such cream, upon being cooled to a desirable refrigerating temperature of approximately 45 degrees F., becomes substantially solid or congealed. This machine produces congealed cream by cooling in two stages, the first stage comprising the cooling on the exterior of the cylinder 11 and the second stage comprising the cooling on the cylinders 12 and 13. Thus the cylinder 11 may be used to reduce the temperature of the cream from its pasteurizing temperature to about 90 degrees F. and the further cooling on the cylinders 12 and 13 will, for example, reduce the temperature to about 45 degrees F.

Figure 2:
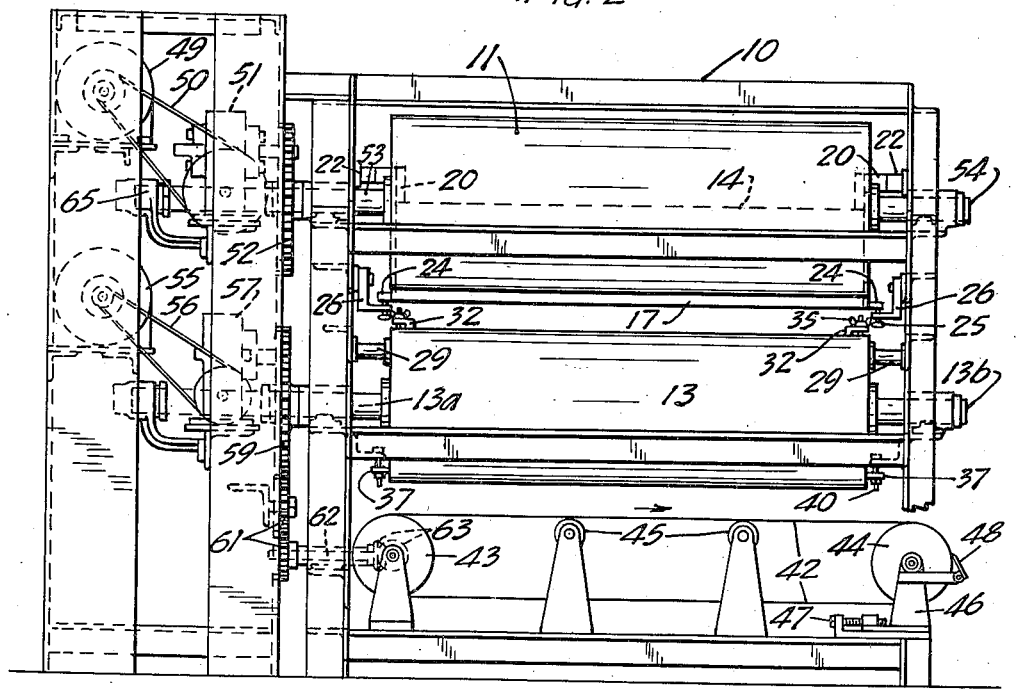
Fig. 2 is a side elevational view of the same with a portion of the frame broken away to show parts otherwise concealed.

The cream is fed continuously to the trough, indicated generally by the numeral 14, and is allowed to accumulate in a pool therein. As the cylinder 11 rotates, its outer surface is coated with cream supplied by the trough 14. The coating is carried upward over the upper periphery and down at the right side, as seen in Fig. 6, until it reaches the wall 17 with its sealing strip 19. This wall is held in firm sliding contact with the lower periphery of the cylinder and acts as a scraper to remove the coating of somewhat viscous cream and to cause it to fall into the lower trough having a bottom formed by the cylinders 12 and 13 and side walls formed by the bars 30. These bars are supported with their lower edges slightly spaced from the respective cylinders so that they spread the cream as a coating of uniform thickness on the chilled cylindrical surfaces. As these cylinders rotate in opposite directions they carry the coating outward from the center of the trough and then downward and inward until the respective coatings reach the scraper 36 below the bight between the cylinders. By the time the cream reaches the scraper 36 it is in the desired congealed condition. The scraper forcibly removes the coatings so that the product falls and is collected on the conveyor 42. As further hereinbefore described, this conveyor delivers the product at the right end of the machine, as shown in Figs. 2 and 5.

All parts of the machine which come in contact with the cream are constructed from stainless metal or other material which can be readily cleaned and sterilized and which are non-reactive to the product. For example, all contact parts may be constructed from stainless steel with the exception of the sealing strips 18 and 19 and scrapers 36 and 48. These scrapers may be constructed from suitable hard wood and the sealing strips may comprise cork or other non-metallic, compressible material which is non-reactive to the cream or other product to be treated. The surfaces of the trough 14, cylinders 11, 12 and 13 and belt 42 which come in contact with the cream are all readily accessible for cleaning and sterilization. To gain access to the interior of the trough 14, it is only necessary to move the supporting hangers 26 out of the path of the studs 24 projecting from the ends of the trough and to swing the latter downward and outward about the pivot pins 21 to an accessible position, such as that indicated in dotted lines in Fig. 6.

The present machine has a large capacity and is highly efficient as a heat transfer mechanism. Reliable, uniform results are obtained with a minimum of attention, since the surface coatings of cream or other product on the several heat transfer cylinders may be readily controlled and adjusted to obtain a uniform coating.

Having described my invention, what I claim as new and desire to protect by Letters Patent is:

1. In a machine of the class described, a cylinder disposed with its axis horizontal, means for supplying a cooling medium to the interior of said cylinder, a trough extending along and at one side of said cylinder to receive the liquid to be cooled, said trough having a longitudinal wall extending beneath the cylinder and in parallel relation to the axis thereof and also having end walls projecting laterally from the periphery of the cylinder, pivot supports for the upper portion of the trough permitting oscillating movement to and from the cylinder, sealing members carried by said longitudinal wall and end walls for contact with the exterior surface of said cylinder, means for engaging the lower portion of the trough to press said sealing members against the cylinder, said last mentioned means being operable to release the lower portion of the trough and allow it to swing outward from the cylinder about said pivot supports and means for revolving the cylinder about its axis.

2. In a machine for congealing cream and like products, a cylinder disposed with its axis horizontal, a trough extending along and at one side of said cylinder to receive the liquid cream and to apply it to the exterior surface of said cylinder, said trough having a longitudinal wall extending adjacent to the cylinder and in parallel relation to its axis and also having end walls projecting laterally from the periphery of the cylinder, sealing members carried by the edges of said longitudinal wall and end walls for contact with the exterior surface of said cylinder, said longitudinal wall and the sealing member carried thereby being disposed to remove cream from the lower periphery of said cylinder a pair of cylinders mounted with their axes in horizontally spaced relation to each other and with their peripheries in rolling contact one with the other below said longitudinal wall of the trough to receive the cooled cream therefrom by gravity, means for spreading the cream on the upper peripheries of the cylinders of said pair, means positioned below the bight of said cylinders for removing the congealed cream therefrom, and endless belt conveyor extending longitudinally of the bight of the pair of cylinders below the same to receive and collect the congealed product therefrom, means for rotating the several cylinders, means for cooling them and means for operating said belt to deliver the congealed cream at an end of the machine.

3. In a machine of the class described, a cylinder disposed with its axis horizontal, means for supplying a cooling medium to the interior of said cylinder, a trough extending longitudinally beneath and at one side of said cylinder to receive liquid to be cooled and to apply it to the exterior surface of the cylinder, means pivotally supporting said trough and permitting it to be oscillated to an inverted position spaced from and at one side of said cylinder, said trough having a longitudinal wall extending in parallel relation to the axis of said cylinder and also having end walls projecting laterally from the periphery of the cylinder, sealing members carried by the edges of said longitudinal wall and end walls for contact with the exterior surface of said cylinder, supporting means for the lower portion of the trough adapted to be manipulated for pressing said sealing members in contact with said cylinder and means for revolving said cylinder about its axis in a direction to carry a coating of liquid from the top of the trough upon the periphery of the cylinder.

ALEX JOHNSON.

REFERENCES CITED

The following references are of record in the file of this patent:

UNITED STATES PATENTS

| Number | Name | Date |
| --- | --- | --- |
| 1,630,864 | Schmidt | May 31, 1927 |
| 1,742,171 | Vogt | Dec. 31, 1929 |
| 2,131,439 | Johnson | Sept. 27, 1938 |